Patented June 17, 1952

2,601,022

UNITED STATES PATENT OFFICE 2,601,022

PURIFICATION OF METAL CARBONYLS

Dallas T. Hurd, Schenectady, N. Y., assignor to General Electric Company, a corporation of New York No Drawing. Application June 6, 1950, Serial No. 166,552

5 Claims. (Cl. 202—57)

The present invention relates to a process of purifying metal carbonyls. It is particularly concerned with the purification of metal carbonyls of metals of the sixth group of the periodic table.

Impurities present in the carbonyls of the sixth group metals result in some cases from impurities in the raw material, such as the ore, and in other cases from catalysts employed in the preparation of the carbonyl. Typical impurities found in tungsten ore, for example, include iron, manganese, sulphur, arsenic, etc. In addition, compounds of iron, nickel, cobalt, or the metals themselves may be introduced as catalytic agents in the carbonyl synthesis and thus must be later removed from the reaction products.

The usual procedure for extracting the carbonyls of chromium, molybdenum and tungsten from reaction mixtures comprising carbonyls of metals other than the sixth group metals has been to add to the mixture an excess of dilute acid and thereafter distill out the volatile carbonyl compounds of chromium, molybdenum or tungsten. It has been found, however, that such distillation from an acid solution permits certain impurities such as the volatile compounds of iron, cobalt and the like to distill over with the sixth group metal carbonyl and to contaminate it. As a result, in order to obtain a purer product it has usually been necessary to follow this process by an additional purification by vacuum sublimation.

The present invention is based on the discovery that carbonyls of the sixth group metals can be completely purified by distilling the impure carbonyls in contact with a strong aqueous alkali. Such a distillation procedure has been found to destroy the volatile compounds of iron, manganese, nickel and similar metals which would otherwise contaminate the distillation product. These decomposition products are retained in the alkali solution which does not affect the carbonyls of chromium, molybdenum and tungsten, even at the boiling point of the solution. The distilled carbonyls are sufficiently pure that it is unnecessary for any additional purification treatment such as by vacuum sublimation. Preferably, the crude carbonyl, as it is obtained, for example, from the reaction between tungsten hexachloride, metallic reducing agents such as zinc and carbon monoxide is first steam-distilled to recover the crude metal carbonyl; i. e., the impure carbonyl of chromium, molybdenum or tungsten. This crude carbonyl is then redistilled from a bath of alkali solution and is separated by filtration of the distillate. In this process the vapor of the metal carbonyl distills with the water vapor and in the condenser, the vapor of the carbonyl is crystallized in the form of fine, white crystals.

Alternatively, it is possible to carry out the distillation from the alkali solution employing the crude reaction mixture from the carbonyl synthesis. However, when this is done somewhat more care must be exercised during the distillation process from the alkali solution. In either process, the hydrides, chlorides, and carbonyl compounds of the impurities such as iron, nickel, manganese, cobalt, sulfur, arsenic and the like are decomposed by the hot alkaline solution and are thereby prevented from distilling with the carbonyl.

In order that those skilled in the art may better understand how the present invention may be carried into effect, the following illustrative examples are given.

Example 1

Crude tungsten carbonyl, dirty and contaminated with yellow iron carbonyl, was placed in a large flask together with about 1 liter of 5% sodium hydroxide solution. The flask was fitted with a water-cooled condenser to condense the distillation products. Upon boiling the mixture in the flask, the tungsten carbonyl distilled over with the water vapor and collected in the condenser in the form of snow-white crystals. The collected tungsten carbonyl was a yield of approximately 100% based on the weight of carbonyl charged to the apparatus.

Example 2

Tungsten carbonyl was prepared by the reaction of 10 grams of tungsten hexachloride, 15 grams of a metallic reducing agent, and carbon monoxide in 100 milliliters of ether at a pressure of 1500 lbs. per sq. in. and a temperature of 100° C. Following the reaction, the reaction mixture was placed in a distillation flask and to it was added a solution of 20 grams of sodium hydroxide in 400 milliliters of water. Distillation of the mixture yielded a snow-white product of crystalline tungsten carbonyl. The amount of product obtained was 8 grams, representing a yield of about 90% based on the weight of tungsten chloride charged to the reactor.

Similar results are obtained on the substitution of impure chromium carbonyl or impure molybdenum carbonyl for the tungsten carbonyl in either of the above examples. Various alkaline materials may be used in place of the sodium hydroxide. For example, potassium hydroxide, barium hydroxide, lithium hydroxide, etc., can be employed. In general, the concentration of the alkali should be at least 1% by weight based on the weight of the solution. The maximum concentration is not particularly critical except that as the concentration of hydroxide is increased, the boiling point of the solution will also be increased and a point may be reached at which some thermal decomposition of the carbonyl will take place. Hence, for practical purposes it is preferred to employ alkali solutions containing from 1 to 20% by weight of sodium hydroxide or equivalent hydroxide. Somewhat above the minimum amount of alkali should be present to react with and retain all the impurities when the carbonyl being treated is a crude reaction product such as that obtained in Example 2. On the other hand, if a steam distillation precedes the alkali purification, the amount of impurities will be correspondingly smaller so that the more dilute alkali solutions are preferred.

What I claim as new and desire to secure by Letters Patent of the United States is:

1. A method of purifying a metal carbonyl selected from the group consisting of the carbonyls of tungsten, molybdenum and chromium which comprises mixing said carbonyl with an aqueous solution comprising from 1 to 20% by weight of a hydroxide of a metal selected from the group consisting of the alkali and alkaline earth metals and heating said mixture to distill therefrom the purified carbonyl.

2. The method of claim 1 in which the metal carbonyl is tungsten carbonyl.

3. The method of claim 1 in which the metal carbonyl is molybdenum carbonyl.

4. The method of claim 1 in which the metal carbonyl is chromium carbonyl.

5. The method of purifying impure tungsten carbonyl containing iron carbonyl as an impurity which comprises mixing said impure carbonyl with an aqueous solution of 5% by weight of sodium hydroxide distilling said mixture to obtain a distillate comprising the purified tungsten carbonyl and water, and separating the purified tungsten carbonyl from said distillation product.

DALLAS T. HURD.

REFERENCES CITED

The following references are of record in the file of this patent:

UNITED STATES PATENTS

| Number | Name | Date |
|---|---|---|
| 1,894,239 | Naumann | Jan. 10, 1933 |
| 2,004,534 | Muller | June 11, 1935 |

OTHER REFERENCES

Lander et al.: "Plating Molybdenum, Tungsten, and Chromium by Thermal Decomposition of their Carbonyls," American Institute of Mining and Metallurgical Engineers, Metals Technology, vol. 14, September 1947, T. P. 2259, pages 1–6 and 42.

Zeitschrift für Anorganische und Allgemeine Chemie, vol. 221, pages 326–331.